April 13, 1943.  C. W. CLEMONS  2,316,563
ROOM HEATER
Filed Dec. 2, 1940  2 Sheets-Sheet 1
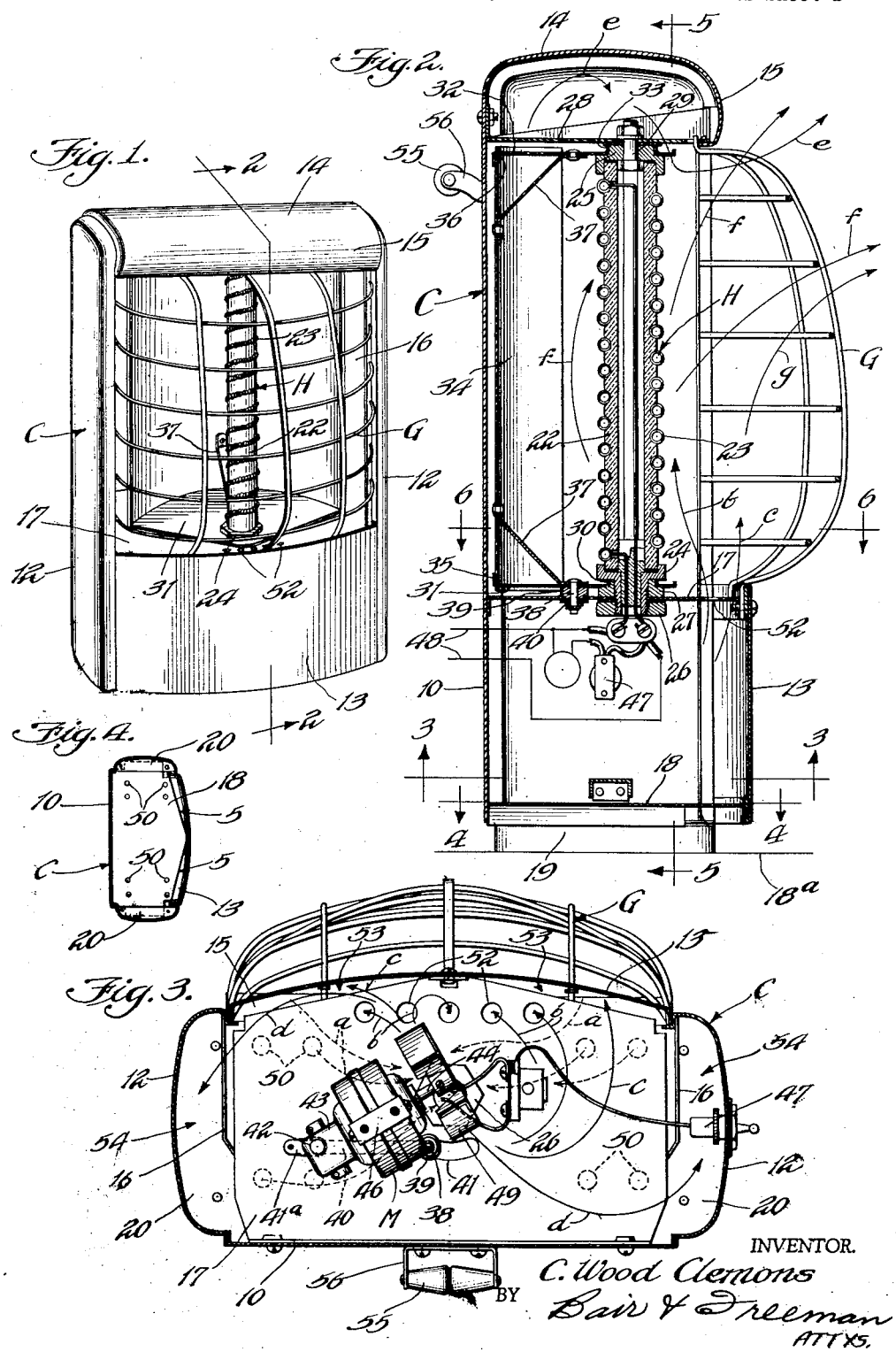
INVENTOR.
C. Wood Clemons
BY Bair & Freeman
ATTYS.

April 13, 1943.  C. W. CLEMONS  2,316,563
ROOM HEATER
Filed Dec. 2, 1940  2 Sheets-Sheet 2
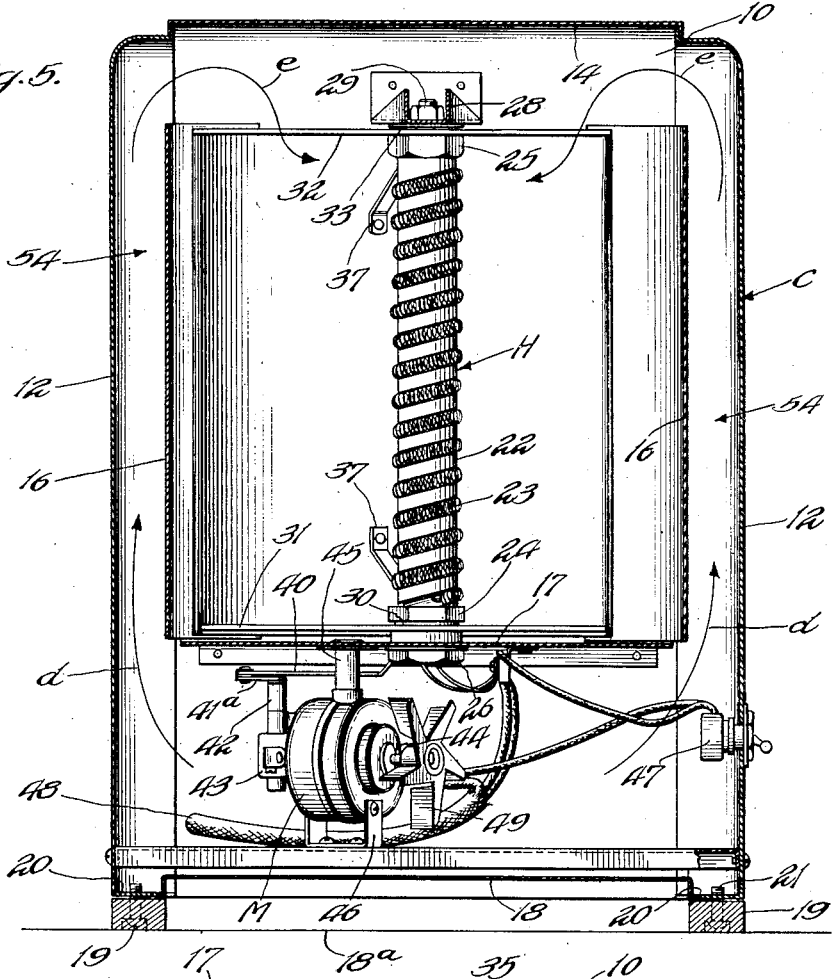
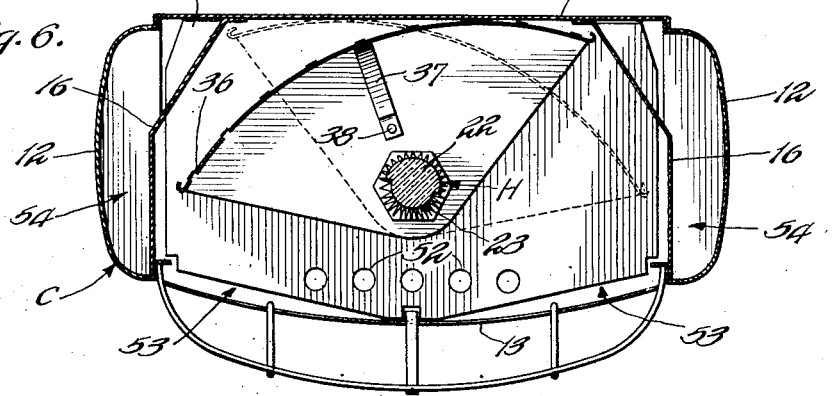
INVENTOR.
C. Wood Clemons
BY Baird & Freeman
ATTYS.

Patented Apr. 13, 1943

2,316,563

UNITED STATES PATENT OFFICE 2,316,563

ROOM HEATER

C. Wood Clemons, St. Louis, Mo., assignor to Knapp-Monarch Company, St. Louis, Mo., a corporation of Missouri Application December 2, 1940, Serial No. 368,239

8 Claims. (Cl. 219—34)

My present invention relates to a heater for heating a room or other space by electricity.

One object of the invention is to provide a heater which is relatively inexpensive to manufacture and efficient in operation.

Another object is to provide a heater having a reflector for reflecting heat from the heating element of the heater so that the heat can be directed as desired.

Another object is to provide the reflector movably mounted so that it may be moved to different positions for reflecting the heat in different directions from the casing of the heater.

Still another object is to provide a means for oscillating the reflector so that the reflected heat may be distributed with respect to the space in the room when desired.

A further object is to provide an electric motor for oscillating the reflector and a control in the form of a switch for causing the motor to be continuously operated as desired or stopped in any desired position of the reflector with relation to the casing of the heater.

Still a further object is to provide a fan driven by the motor and operable to pick up cold air from adjacent the floor surface and circulate it up over the heating element to be directly heated thereby and to circulate a portion of the air through the casing between certain main and false side walls thereof to substantially cool the casing and at the same time effect absorption of heat from the false side walls by the air being thus circulated, such air finally issuing from the front of the casing and into the room.

As a further object of my invention, I provide a novel means for mounting a postlike heating element within the casing and pivotally mounting a semi-cylindrical reflector so that it may oscillate on a center which is substantially at the axis of the heating element.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings forming a part of this specification and throughout the views of which like reference characters refer to the same parts.

Figure 1 is a perspective view of a room heater embodying my invention;

Figure 2 is an enlarged vertical sectional view thereof on the line 2—2 of Figure 1;

Figure 3 is a sectional view on the line 3—3 of Figure 2 showing a bottom plan view of a false bottom wall and a reflector oscillating motor and fan;

Figure 4 is a sectional view on the line 4—4 of Figure 2 showing particularly a base plate on a reduced scale;

Figure 5 is a vertical sectional view on the line 5—5 of Figure 2, and

Figure 6 is a horizontal sectional view on the line 6—6 of Figure 2.

On the accompanying drawings I have used the reference character C to indicate generally a casing and H a heating element therein. The casing C has a back wall 10, main side walls 12 and 12, a front wall 13 extending only part way up the front of the casing, and a top wall 14 terminating in a downturned partial front wall 15. Within the casing C false side walls 16 and 16 are provided and also a false bottom wall 17. At 18, I show a base plate which is spaced somewhat above a floor surface 18a on which the casing C rests through the medium of feet 19 and 19. The feet 19 may be secured to inturned flanges 20 and 20 at the lower edges of the side walls 12 and 12 as by screws indicated at 21.

The heating element H consists of a postlike core 22 of insulating material, such as porcelain or lavite, and a resistance wire 23 wound helically thereon. For supporting the post 22 I provide a bottom bushing 24 having a cupped upper end to receive the lower end of the post, with a somewhat similar cupped end of an upper bushing 25 receiving the upper end of the post. The bushing 24 is secured to the bottom false wall 17 by a nut 26 with a shouldered washer 27 interposed between the wall and the cupped upper end of the bushing 24. The bushing 25 is secured to a cross bar 28 in the upper part of the casing C by a bolt 29.

The washer 27 is shouldered to receive a hub portion 30 of a reflector end member 31. Another reflector end member 32 has a hub portion 33 encircling a reduced part of the bushing 25. Thus the reflector end members 31 and 32 are rotatably or oscillatably mounted with respect to the heating element H and on a pivotal axis which is substantially coincident with the axis around which the resistance wire 23 is wound.

A semi-cylindrical reflector 34 is supported by the end members 31 and 32 as by ears 35 extending from the peripheral edges of the members 31 and 32 through slots 36 of the reflector 34. The ears are then bent upwardly for the member 31 and downwardly for the member 32, as shown in Figure 2. The reflector 34 is parabola-shaped in cross section.

A pair of angular braces 37 and 37 are provided for bracing the reflector end members with respect to the reflector itself. The braces are suitably secured in position as by rivets at their ends. At the lower end of the lower brace 37, a pivot pin 38 is provided which extends downwardly through a sleeve 39 and has a link 40 mounted on its lower end. The sleeve 39 has a shouldered part adapted to travel in an arcuate slot 41 of the bottom false wall 17.

The link 40 is pivoted to a crank arm 41a of a crankshaft 42. The crankshaft 42 is driven through suitable step down gearing mechanism in a housing 43 from the shaft 44 of a motor M. The motor M is supported between the bottom false wall 17 and the base plate 18 by a post 45 and a bracket 46. The motor M is suitably wired to a switch 47 so that energization of the motor may be controlled as desired, independent of energization of the resistance wire 23, which is energized whenever a supply cord 48 is plugged into a service outlet in the normal manner.

On the shaft of the motor 44, I provide a fan 49 for circulating air, as will now be described. The air is first taken in as indicated by dotted line arrows a in Figure 3 through openings 50 in the base plate 18 and through spaces 51 and 51 between the front edge of the base plate and the front wall 13 of the casing C (see Figure 4). The air is discharged centrifugally, as indicated by the arrows b, c and d, to pass upwardly through openings 52 in the bottom false wall 17 and through spaces 53 and 53 between the front edge of this wall and the front wall 13. The air driven upwardly, as indicated by the arrows b and c, is directly heated by the resistance wire 23 when energized, as indicated by the arrow f, and part of it, as indicated by the arrow G, is heated by radiation and the air thus heated flows outwardly through a guard G on the open front of the casing C. Part of the air discharged by the fan 49 flows, as indicated by the arrow d, into spaces 54 and 54 between the false side walls 16 and 16 and the main side walls 12 and 12 and absorbs heat from the walls 16 and 16. The air then flows over the upper edges of the walls 16 and 16, as indicated by the arrow e and finally issues with the directly heated air from the front of the casing C. This keeps the casing cool and at the same time efficiently carries away the heat generated by the heating element H and directs it into the room.

The parabolic reflector 34 also effectively directs the heat into the room by reflection. The reflector when oscillated may move as from the solid line position of Figure 5 to the dotted line position, and accordingly will successively direct the heat toward different points in the room, swinging from left to right and then back again. Thus the reflected heat is evenly distributed throughout the portion of the room in front of the heater to provide an effective heating of the air in the room over a relatively wide area. When it is desired to stop oscillation of the reflector for the purpose of having the reflected heat directed toward one point in the room, this may be done by opening the switch 47 at the proper time with respect to the position of the reflector during its cycles of oscillation.

The guard G is preferably made of a plurality of spaced vertical and horizontal wires spot welded or otherwise suitably secured together and suitably mounted by screws or the like with respect to the casing C. The guard G bulges forwardly so that if the heater is tipped over on its face the heating element H will be held a safe distance from the floor surface or from a rug thereon. A handle 55 is mounted on a bracket 56 at the back of the casing C for convenience in moving the heater from one position to another.

In accordance with the provisions of the patent statutes, I have described the principle of operation of my invention together with an illustration of a room heater which I consider to represent the best embodiment thereof, but I desire to have it understood that the structure disclosed is only illustrative and that the invention may be carried out by other means within the scope of the appended claims.

What I claim as new and desire to secure by Letters Patent of the United States is:

1. In a portable room heater, a vertical sheet metal casing open at its front, false side walls in said casing spaced from the main side walls thereof, said false side walls terminating at their lower edges above the bottom of the casing and at their upper edges below the top of the casing, to receive air between said false walls and casing from within the casing at the bottom and to discharge such air at the top within said casing, a vertically arranged post of insulating material in said casing, a heating element wound thereon, a semi-cylindrical reflector pivotally mounted in said casing behind said heating element for reflecting substantially all of the heat radiated rearwardly therefrom and having a parabolic cross section with its pivotal center at the longitudinal axis of said heating element, and means for oscillating said reflector and thereby continuously oscillate the reflected beams of heat from said room heater.

2. In a room heater, a casing open at its front, a vertically arranged post of insulating material in said casing, a heating element wound thereon, a semi-cylindrical reflector in said casing having a parabolic cross section, said reflector having bearing portions pivoted on the axis of said insulating post, means for oscillating said reflector comprising a motor having a crankshaft, a link connection between said crankshaft and said reflector at a point spaced from the pivotal axis of the reflector, and a fan driven by said motor, said fan drawing air from adjacent a floor surface on which the heater is supported and discharging it across said heating element to issue from the open front of said casing.

3. In a heater of the character described, a casing having an open front, a base plate at the bottom thereof and spaced above a supporting surface for the casing, side and bottom false walls within said casing and spaced from the sides of the casing and from said base plate respectively, a post of insulating material, a bushing on said bottom false wall for supporting the lower end of said post, a bushing for supporting the upper end of said post, a heating element wound on said post, a semi-cylindrical reflector having a parabolic cross section and end members having perforated portions surrounding said bushings whereby to pivotally mount said reflector relative to said heating element with the axis of the heating element substantially coincident with the pivotal axis of said reflector, a motor between said base plate and said false bottom wall and operatively connected with one of said end members of said reflector for oscillating the reflector, a fan driven by said motor and operative to draw air from below said base plate and circulate a part thereof upwardly across said heating element to be directly heated thereby and discharged out of the open front of the casing, and to circulate a part of said air upwardly between said false and main side walls and then into said casing in front of said reflector to be mixed and discharged with the air directly heated by said heating element.

4. A heater of the character described comprising a casing having an open front, a base plate at the bottom thereof and spaced above a supporting surface for the casing, a bottom false wall within said casing and spaced from said base plate, a post of insulating material, a bushing on said bottom false wall for supporting the lower end of said post, a bushing for supporting the upper end of said post, a heating element wound on said post, a semi-cylindrical reflector having end members perforated and surrounding said bushings whereby to pivotally mount said reflector relative to said heating element with the axis of the heating element substantially coincident with the pivotal axis of said reflector, a motor between said base plate and said false bottom wall and operatively connected with one of said end members of said reflector for oscillating the reflector, and a fan driven by said motor and operative to draw air from below said base plate and circulate it past said heating element and discharge it through said open front of said casing.

5. In a room heater, a casing open at its front, false side walls in said casing spaced from the main side walls thereof, a core of insulating material in said casing, a heating element wound thereon, a reflector for heat from said heating element, said reflector being pivotally mounted in said casing, means for oscillating said reflector including a motor, and a fan driven by said motor and drawing air from adjacent a floor surface on which the heater is supported and discharging it partly upward to be directly heated by said heating element and partly between said false and main side walls to be heated by said false side walls and then flow over the upper edges thereof and issue from the open front of said casing with the air directly heated by said heating element.

6. In a room heater, a casing open at its front, a heating element in said casing, a reflector for said heating element pivotally mounted in said casing, means for oscillating said reflector comprising a motor having a crankshaft operatively connected with said reflector at a point spaced from the pivotal axis thereof, and a fan operated by said motor to circulate air past said heating element and discharge it from the open front of said casing.

7. In a heater of the character described, a post of insulating material, bushings for supporting the ends of said post, a heating element wound on said post, a semi-cylindrical reflector having end members perforated to receive said bushings whereby to pivotally mount said reflector relative to said heating element, a motor in said casing and operatively connected with said reflector for oscillating it, and a fan driven by said motor and operative to circulate air past said heating element to be discharged out of the open front of said casing.

8. In a heater of the character described, a casing having an open front, a bottom wall within said casing, a post of insulating material, an element on said bottom wall for supporting one end of said post, a second element for supporting the other end of said post, a heating element wound on said post, a semi-cylindrical reflector having hubs surrounding said elements whereby to pivotally mount said reflector relative to said heating element with the axis of the heating element substantially coincident with the pivotal axis of said reflector, and a motor located below said bottom wall and operatively connected with said reflector for oscillating the same and thereby changing the direction of heat reflection by said reflector.

C. WOOD CLEMONS.